March 24, 1970    C. L. RICHARDS, JR    3,502,015
PNEUMATICALLY OPERATED CAMERA SHUTTER
Filed Oct. 31, 1966    3 Sheets-Sheet 1
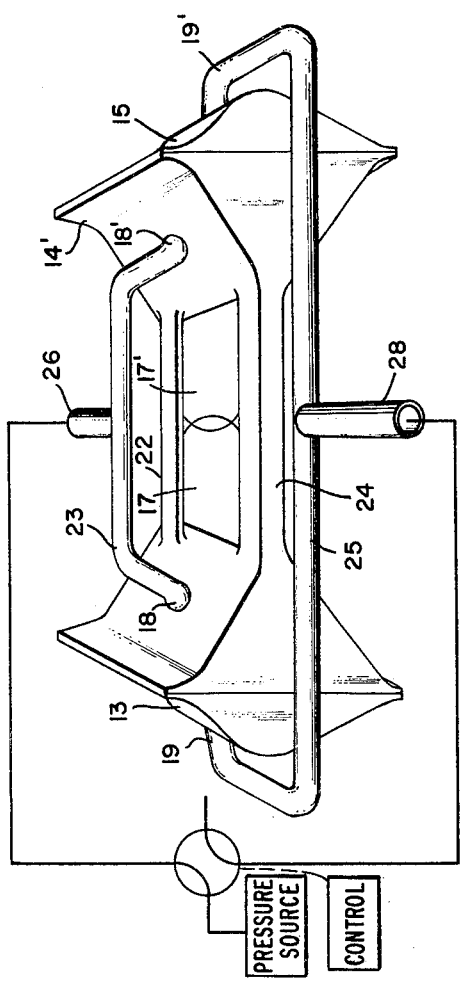
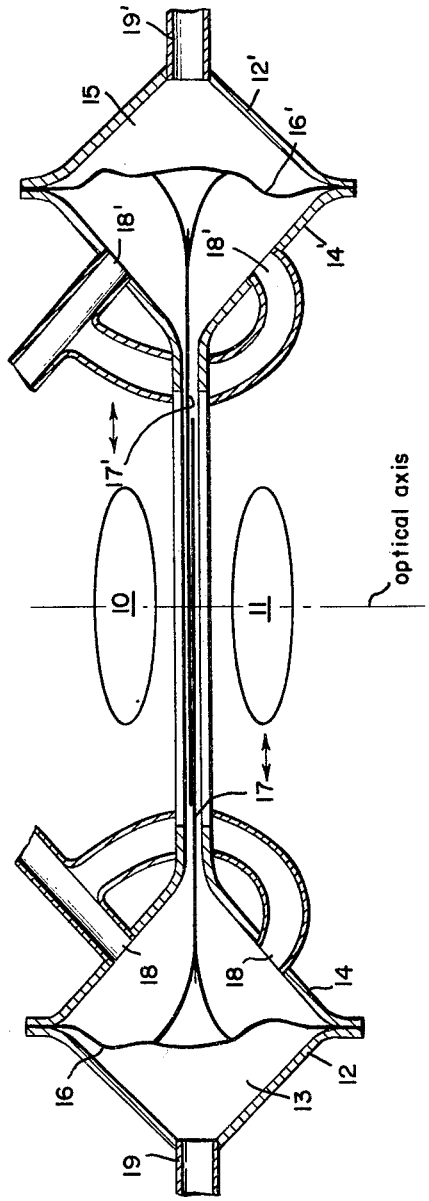
Chester L. Richards, Jr.,
INVENTOR.
BY
GOLOVE & KLEINBERG.
ATTORNEYS.

United States Patent Office 3,502,015
Patented Mar. 24, 1970

3,502,015
PNEUMATICALLY OPERATED CAMERA SHUTTER
Chester L. Richards, Jr., Costa Mesa, Calif., assignor to Hycon Manufacturing Co., Monrovia, Calif.
Filed Oct. 31, 1966, Ser. No. 590,889
Int. Cl. G03b 9/00
U.S. Cl. 95—54                                                8 Claims

ABSTRACT OF THE DISCLOSURE

A camera shutter apparatus having, in a first embodiment, shutter blades fastened to lightweight inelastic membranes. Application of fluid pressure to one side of the membranes drives the shutters to the open position while fluid pressure to the opposite side of the membranes closes the shutters. In alternative embodiments, a continuous, inelastic web is fastened at opposite sides of the optical axis and defines a pair of expandable chambers. Fluid pressure applied to one side of the axis pulls the membrane across the optical axis to occupy a first chamber. Fluid pressure applied to the opposite side of the optical axis pulls the membrane back to fill a second chamber.

---

This invention relates to pneumatically actuated cameras and, more particularly, to cameras utilizing a gas at a controlled pressure driving a shutter.

Of the many features desirable in a quality camera, high shutter speed is extremely useful where very rapid motion is to be stopped. Scientific photography is frequently aided by extremely high shutter speeds. High shutter speeds also allow the use of high speed films in situations where the light would normally be too great for such films.

A high quality camera should not react to the operation of its parts during exposure of the film in such a way as to cause camera vibration and blurring of the picture. Moreover, the operating parts should be few since the compounding of operating portions compounds the difficulty of maintaining operational accuracy. Accurate timing of shutter operations is especially important to operational accuracy.

In addition to the above individual features, automation (the ability to perform operations automatically) has, in and of itself, become a desirable feature. A number of the operations performed by a camera have been automated. Lens diaphragms are opened and closed automatically, shutters are cocked automatically, and various other operations take place automatically.

Not oddly, many of these features display substantial antipathy to one another. For example, the accuracy of shutters is often maintained by spring-tension mechanisms which also operate to provide a substantial shutter speed. These mechanisms, however, tend to generate a substantial camera reaction which increases the noise, shake, and thus the inaccuracy of any individual exposure. The high level of reaction also tends to slow the speed of operation between exposures, particularly where the operation is automated. The automating of operations also tends to compound the complexity of any camera, increase its sensitivity, and lower its operating life. The spring motors, electric motors, and other parts used in most automatic cameras have all of the above-mentioned problems. It may, therefore, be stated that the most useful features which a camera may have area, in general, antagonitsic to one another and not realizable heretofore within the same structure.

A special category of cameras creates still other problems which are not commonly found in the conventional still camera. Consider the problems of aerial photography which require a camera that provides a large format, a wide field of view (ranging from 20° to 45°) and a long focal length system of the type essential to high resolution photography. In order to expose the large format, which typically might include an exposure area in excess of 20 square inches, very large apertures are necessary to provide sufficient light to expose the film. Focal lengths range from 3 inches to longer focal lengths, depending upon the type of camera and the use to which it is put. For example, cartographic cameras may have focal lengths as short as 3 inches, but most aerial cameras have focal lengths in excess of 6 inches.

In daylight photography, using high resolution film, a camera mounted in a high speed aircraft must use a relatively fast shutter to prevent blurring of the image due to relative motion of the camera and the object. Therefore, depending upon the light available, shutter speeds ranging from $\frac{1}{250}$ to $\frac{1}{4000}$ of a second are desirable. Therefore, the combined requirements of a large aperture and high shutter speed to open and close such an aperture have not been achieved in the otherwise preferable intralens shutter.

An intralens shutter, for a large aperture lens, which may typically be some 3 inches in diameter or larger to operate at speeds in excess of $\frac{1}{250}$ of a second, requires a plurality of large blades moving at extremely high speeds. This involves great complexity and is achievable, if at all, only at an exorbitant cost. As a general, "rule of thumb," any aperture larger than 3 inches has been considered beyond the capability of an intralens shutter. This field, then, has been virtually abandoned to the focal plane type of shutter.

However, it is clear that the intralens shutter has many desirable advantages over the focal plane shutter. For example, the total time required to make an exposure is relatively short, and, accordingly, the time between successive exposures can also be short, thereby permitting relatively high cycling rates, and consequently a higher frame rate. Other advantages are greater accuracy in the control of the timing of the exposure. Also, the entire format can be exposed virtually simultaneously, which enables the most efficient utilization of artificial lighting. In addition, the placement of the shutter mechanism in the vicinity of the lens rather than at the focal plane permits greater flexibility in the design of the camera itself.

These advantages, unfortunately, have in the past been far outweighed by the disadvantages of high cost, poor reliability, extreme mechanical complexity, inability to achieve high shutter speeds when used with large apertures, and the vibration and reactions set up in the vicinity of the lens system during operation.

It is desirable to have, in a large format, large aperture camera, and especially in a high speed aerial camera, a shutter which can provide faster exposure times. Other desirable features are high reliability and greater simplicity, ruggedness and speed, over prior art devices. These features have been combined, according to one embodiment of the present invention, in the form of a guillotine, bistable-type, shutter in which a pair of opposed blades open and close from the center of the lens aperture relative to the optical axis.

If the elapsed time for an exposure is shortened, at any given frame rate, more time is available for film transport. Moreover, if image motion compensation is required, the interval during which motion must be compensated is made shorter and, in the case of low level photography, wherein the film must move during the exposure to keep the image from blurring, a shorter length of film must be transported in a shorter exposure interval.

For a specialized application in which an aperture of up to one and one-half inches was exposed, apparatus for opening the shutters in approximately 600 microseconds was described and shown at page 264 of the Journal of Scientific Instruments, vol. 38, June 1961, published by the Institute of Physics, London, England. That device involved a pair of opposed cylinders, each capped by an inelastic, flexible "shutter" diaphragm. A first flexible diaphragm was expanded and interposed in the aperture, and was connected to a source of vacuum through an interposed first frangible diaphragm. A second flexible diaphragm was collapsed and was similarly connected to a source of gas under pressure, but separated therefrom by a second, frangible diaphragm.

On the occurrence of an event to be photographed, the first frangible diaphragm was ruptured, connecting the evacuated chamber to the first flexible diaphragm, thereby causing its collapse at extremely high speeds. When the shutter was to be "closed," the second diaphragm was ruptured and the pressurized source was connected to the second flexible diaphragm which expanded to block the aperture.

According to the present invention, either a focal plane or an intralens application is possible, thereby enabling either type to be employed in any given application.

In a first embodiment, a "guillotine" type shutter is provided, in which each of a pair of membrane-chamber combinations is provided with a shutter blade, fastened to the membrane and orthogonal thereto. Each chamber has a pair of ports and pressure differentials are applied to alternatively "open" and "close" the shutter blades. The guillotine shutter, however, operates as a two-phase device in each operational cycle. In one phase, blades are opened, and in a second, later phase, the blades are closed.

In an alternative embodiment, a membrane, having an aperture therein, is supported on opposite sides of the area to be exposed, by "chambers" which are connected to sources supplying a pneumatic pressure differential.

The configuration of the chamber is such that the entire area of membrane enclosed therein acts as a "piston" when a pressure differential exists on opposite sides of the membrane. Since the membrane is in the form of a continuous web, the relocation of a portion of the membrane within a chamber on one side of the aperture, works a lateral displacement of the membrane in the area to be exposed.

With sufficiently large chambers, an aperture can be caused to traverse the entire effective lens opening by introducing a pressure differential into only one of the chambers. To return the membrane-web to its starting position, a pressure differential must be created in the opposite chamber, thereby causing the membrane to shift its position within that chamber, requiring the aperture portion of the membrane to thereby laterally traverse the exposure area.

Another alternative embodiment for "Bulb" or night exposures might require that the web be moved in one direction to "open" the shutters. A light source is then activated for the exposure and web motion in the opposite direction "closes" the shutter.

In another alternative embodiment, a pair of membranes, each having an aperture, is mounted in an adjacent relationship. Each membrane has associated therewith, a pair of chambers. A common pneumatic supply is provided so that the webs can be operated in unison. Each web is provided with an aperture and upon actuation, the apertures "cross" the exposure area, but in mutually opposite directions.

With the double webs, yet other embodiments permit the "time exposure" operation, whereby, on a first actuation of the webs, the shutter is "open." On return to the initial condition, the shutter "closes." Still other combinations contemplate even more webs whereby a pair of "capping" curtains can be provided in conjunction with larger apertures.

It is, therefore, a primary object of this invention to improve cameras by providing for an increase in shutter speed, a reduction in camera reaction to operation, a general reduction of mechanical operating parts, and an increase in automatic features within the same structure.

Another object of this invention is to increase the speed of camera shutters while reducing the inertial and reactive forces attendant upon shutter operation.

An additional object of this invention is to reduce the number of parts in a camera.

Yet another object of this invention is to eliminate operating portions of a camera which are extremely sensitive to use and require frequent readjustment.

A more particular object of this invention is to provide a readily automated camera of reduced complexity and high exposure accuracy.

These and other objects are accomplished in accordance with the principles of this invention by a camera which utilizes a gas to accomplish its major operations. More particularly, the camera of this invention utilizes relatively low pneumatic pressures for operating the shutter to expose the film. The camera may also use the gas to provide the power for advancing the film. The arrangements provided for controlling the operating include few mechanical parts and are thus little subject to wear. Inertia and reaction of the camera is reduced by eliminating the heavy moving parts and spring tension drive, allowing only the shutter or the film itself to move in the particular operation initiated. It has been determined that such a camera may be easily automated and will operate repeatedly at extremely high repetition rates.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purposes of illustration and description only and are not intended as a definition of the limits of the invention.

FIG. 1 is a plan, cross-sectional view of a guillotine shutter according to the present invention;

FIG. 2 is a perspective view of the shutter of FIG. 1;

Figures 3A, 3B:
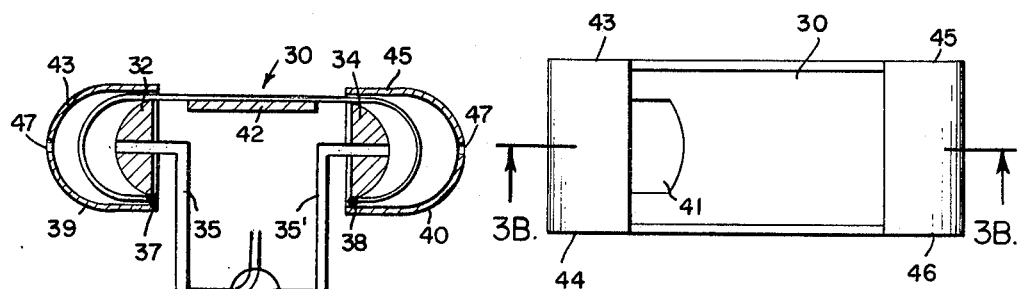
Figure 5:
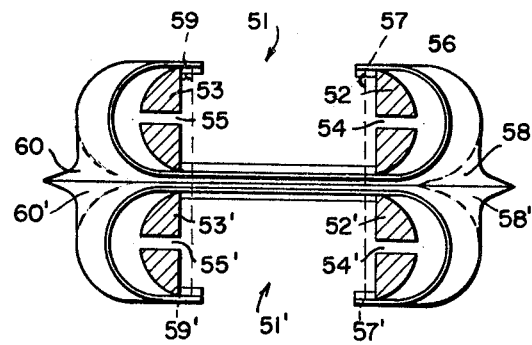
Figure 4A:
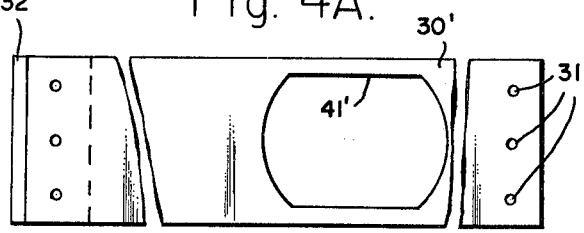
Figure 4B:
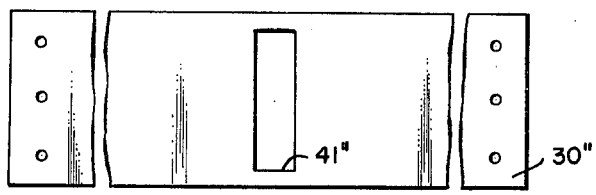
Figure 6A:
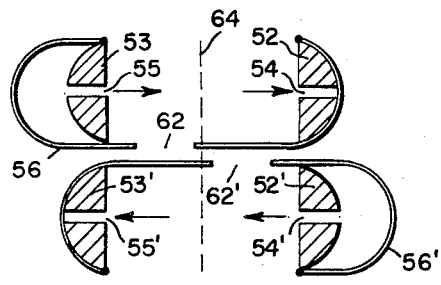
Figure 6B:
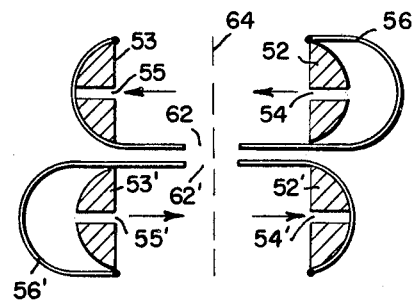
Figure 7A:
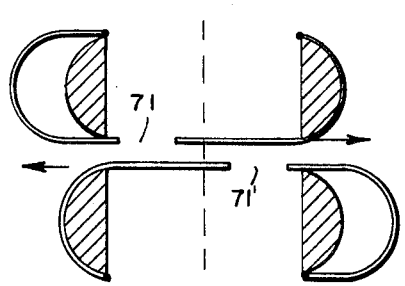
Figure 7B:
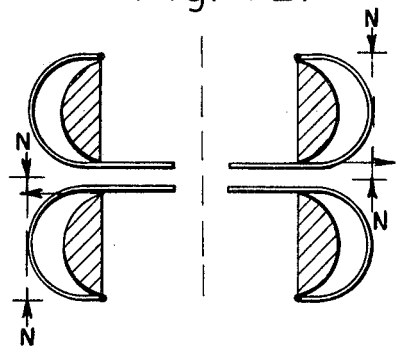
Figure 7C:
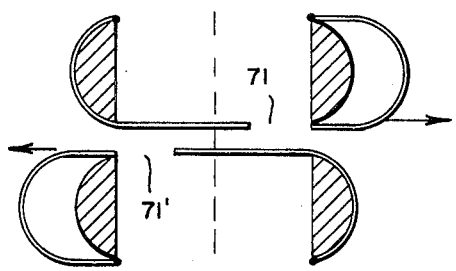

FIG. 3, including FIGS. 3A and 3B, is a front and top cross-sectional view, respectively, of another embodiment of the invention using a continuous, apertured web, the view of FIG. 3B being taken along line 3B—3B of FIG. 3A, in the direction of the appended arrows;

FIG. 4, including FIGS. 4A and 4B, and shows two shutter webs, each of which may be utilized in the embodiment of FIG. 3;

FIG. 5 is a cross-sectional view of a dual shutter arrangement constructed in accordance with the present invention;

FIG. 6, including FIGS. 6A and 6B, is illustrative of the operation of the shutter of FIG. 5; and FIG. 7, including FIG. 7A, 7B and 7C is illustrative of the operation of another shutter similar to that shown in FIG. 5.

Referring now to FIG. 1, there is shown a "guillotine" shutter arrangement, of the "between-the-lens" type, constructed in accordance with a first embodiment of the present invention. First and second lenses 10 and 11 are shown oriented along a common optical axis. Quite obviously any number of lens elements appropriate to the particular lense construction might be used, but a pair has been shown for descriptive purposes.

Between the first and second lens elements 10, 11, are positioned a pair of shutter elements 17, 17'. The shutter elements 17, 17' are adapted to move back and forth as shown by the arrows in a manner such as to "open" and "close" the shutter aperture. A pair of chambers 13 and 15 are positioned on opposite sides of the optical axis. Each of the chambers 13, 15 comprises a pair of mating portions 12, 12' and 14, 14'. The chambers are provided with ports of entry thereto, such as the opening of ports 18, 18' and 19, 19'.

Positioned within each chamber is a diaphragm membrane 16, 16' which is fastened to opposite sides of the chamber. The diaphragm 16, 16' is also fastened in some convenient manner to the shutter elements 17, 17'. When a pneumatic fluid is introduced through the ports 19, 19' of the chambers 13 and 15, the higher pressure on one side of the diaphragms 16, 16' causes those diaphragms 16, 16' to push the shutter elements 17, 17' inwardly toward one another, thereby completely masking the opening. On the other hand, when a fluid is injected at a sufficient pressure through the ports 18, 18', the diaphragms 16, 16' are moved away from the optical axis of lens elements 10 and 11, causing the shutter elements 17, 17' to move apart and open the aperture.

Appropriate pneumatic systems which include means for selectively controlling the application of fluid under pressure to the ports 18, 18' and 19, 19' are well known in the art and are disclosed, for example, in the recently issued patent to B. L. Mann, entitled Fluid Transport System, Patent No. 3,256,908, assigned to the assignee of the invention.

In alternative embodiments, the shutter elements 16, 16' have openings suitably located therein so that an input at either ports 18, 18' or at least ports 19, 19' cause the shutter to both open and close.

It is quite obvious that the shutter elements 17, 17' might be positioned behind the lens elements 10 and 11, in front of those lens elements, or in some other position appropriately selected to facilitate construction of the particular camera.

The chambers 13 and 15 shown in FIGS. 1 and 2 could be constructed of many well-known materials. For example, plastic materials might well suffice to provide an inexpensive and reliable mechanism for supporting diaphragms 16, 16'. It is not necessary that the cylinders be airtight since the diaphragms 16, 16' are quite light in weight and carry only the minimal weight of the shutter elements 17, 17'. Further, the shutter blades (and diaphragms) operate so rapidly that leakage is negligible.

Thus, only a light pressure is needed; and the diaphragms 16, 16' will fill like "sails" and move to their appropriate positions for opening and closing the shutter.

It should be noted that in experimental embodiments additional friction members were provided for holding the shutter elements 17, 17' in the closed position. If fluid tight chambers are utilized, the pressure within a chamber suffices to hold the shutter closed. The shutter elements 17, 17' may be constructed of any well-known shutter material which is normally quite light in weight. A preferred diaphragm may be constructed of a light plastic or resin material or any other material which is readily flexed by a light, controlled, pneumatic pressure. However, the diaphragms should *not* be made of elastic material.

In order to provide closer control of shutter response speeds, it may be desirable to provide means for allowing the gas to both enter and exit from each of the ports 18 and 19. Thus, if gas is forced into the chambers 13 and 15 through the ports 19, 19', gas-tight diaphragms 16, 16' will exhaust gas through the opposite ports 18, 18' as they move inwardly. The opposite effect will occur when gas is forced into the chambers 13 and 15 through the ports 18, 18'. The diaphragms 16, 16' need not be entirely gas-tight. In some circumstances, it may be desirable to decrease the rapidity of response, by utilizing valves to restrict the flow of exhaust gas or fluid.

Turning next to FIG. 2, there is shown an arrangement whereby a particular opening and closing may be effected. The two chambers 13 and 15 are shown with connections made to the ports 18, 18' and 19, 19'. For example, pneumatic pressure lines 23 and 25 connect to the ports 18, 18' and 19, 19' respectively. A pair of lines 26 and 28 from sources of the fluid, which may be compressed air, are connected to the lines 23 and 25. A valve, connected to an appropriate control mechanism, is coupled to a source of fluid under pressure which is alternatively applied, through the valve to the lines 23, 25 of the pair.

A convenient arrangement whereby each of the lines 26 and 28 may be used by both injecting air into the chambers 13 and 15 or for relieving pressure therein by allowing air ejection, is better described below. The shutter elements 17, 17' are shown in an almost "closed" position in FIG. 2. It will be apparent from FIG. 2 that the shutter elements are restricted to slide back and forth in the guides 22 and 24 with the motion of the diaphragms 16, 16'.

As shown, the leading edges of the shutter elements 17, 17', as shown in FIG. 2, are curved to form a guillotine-type of shutter. Other embodiments might utilize more nearly straight edges or might use openings in the shutter elements 17, 17' of various forms (circular, rectangular, and the like) adapted to provide an appropriate exposure aperture.

When a pressurized fluid is applied from the source, as shown, through the line 26 and to the two chambers 13 and 15, the diaphragms 16, 16' (seen in FIG. 1) are forced outward, carrying the shutter elements 17, 17' with them to open the aperture. Depending upon the operational speed desired, the line 28 may be connected to the atmosphere (as shown) to provide for exhausting fluid or may be connected to a source of fluid at a lower pressure (not shown), thereby creating a greater pressure differential and hastening the movement of the diaphragms 16, 16' and the shutter elements 17, 17' connected thereto.

When the direction of application of the fluid is reversed as by actuating the valve so that relatively higher pressure is applied to the line 28, the diaphragms 16, 16' are forced inwardly, thereby carrying the shutter elements 17, 17' toward each other to completely close the aperture. The time interval during which the opening is maintained is controlled by the time required by the control element to switch the valve to connect the relatively high source pressure source to line 28.

It should be noted that the only moving parts within the shutter system shown in FIGS. 1 and 2 are the diaphragms 16, 16' and the shutter elements 17, 17' connected thereto. With only these extremely light members moving during an exposure, the effect of inertia is quite small so that the possibility of moving the camera is substantially reduced. Furthermore, the small number of moving parts substantially reduces wear to a point where it has a negligible effect on accuracy. About the only requirement for accuracy of exposure is a relatively constant pressure by which the gas is applied from exposure to exposure and the minimal frictional effect of the guides 22 and 27. Extremely constant gas pressures may be achieved in a variety of ways in accordance with prior art.

In FIG. 3, including FIGS. 3A and 3B there is shown an alternative embodiment of a shutter arrangement constructed in accordance with the invention. This arrangement has a single shutter element 30 which may be a strip of flexible material (such as a plastic material) and which is shown in greater detail in FIG. 4, of a generally rectangular form. The end portions may be perforated with a number of holes 31 at the opposite ends of the element 30 for attachment to a pair of support structures 32 and 34, to which pressurized pneumatic fluids, such as air, are applied.

The pneumatic fluid is applied through a pair of conduits 35, 35' from a source 33. A switching valve 36 alternatively connects conduits 35, 35' to the source 33 and to atmosphere. The shutter element 30 as shown in FIG. 3, is fastened at points 37 and 38. A pair of control boxes 39 and 40 which may, if desired, be of perforated or expanded metal, are provided to control the speed of movement of the shutter element 30 by controlling the escape of the exhausting air and also to support the web at the extremes of motion to prevent undue strain on the opposite attachment.

Each of the support members 32, 34 and control boxes 39, 40 is fitted with a top cover 43, 45 and a bottom cover 44, 46, respectively. Since the shutter element 30 is the same height as the support members 32, 34, the element 30 combines with the top and bottom covers 43, 45, 44, 46 to form a pair of substantially fluid-tight chambers in which the shutter element 30 moves. In operation, the curtain behaves like a piston or diaphragm, in response to applied fluid under pressure.

The shutter element 30 may have an opening or aperture 41, therein for exposing the photographic material, as best seen in FIG. 4.

Upon the application of air under pressure through conduit 35, increased pressure will be applied to the end portion of the shutter element 30, causing the looped end at the left (as viewed in FIG. 3B) to balloon, pulling the shutter element 30 to the left. During this movement, air will be expelled from the conduit 35' and through valve 36 to atmosphere by pressure caused by the collapsing of the right end of the shutter element 30 against the support member 34. The opening 41 moves across the film plane defined by platen 42 from right to left, as the enclosed volume adjacent the left hand support element 32 expands. Air will also be expelled from the control box 39, either around the end portions thereof or through suitable vents 47 or perforations therein (not shown).

As with the arrangement disclosed above, the shutter element 30 may be constructed of various well known lightweight, inelastic, flexible materials, including plastic and resin materials.

FIG. 4, including FIGS. 4A and 4B, illustrate two of the possible embodiments of the shutter element 30. An opening 41', 41" is precisely positioned for selectively determining the exposure area. This opening 41', 41" is caused, as explained above, to move across the film plane thereby allowing exposure of the photographic material. Depending upon the placement of the aperture 41', 41" the shutter can be designed for Instantaneous or Bulb exposure.

For example, the shutter 30' of FIG. 4A may be used in the so-called "BULB" setting, which is best suited for night photography and which as a relatively large aperture 41', equal to or greater in area than the film plane to be exposed. The aperture is a symmetrically located so that in one position, with the shutter ballooned to the right (as in FIG. 3B), the film plane 42 is completely masked.

When air pressure is applied to conduit 35 and the left hand structure 32, the shuter 30' is pulled to the left, "opening" the shutter, and the aperture 41' exposes the film. To "close" the shutter, the control valve 36 is switched and air is applied to the right hand structure 34. The shutter then balloons to the right and the film plane is again masked.

Since it is desirable to have the shutter "open" and "close" as rapidly as possible, the control boxes 39 and 40 are designed to provide little or no resistance to displaced air as the shutter balloons in the respective boxes.

In the experimental embodiments, shutter assemblies have been constructed without control boxes and have been operated without apparent deleterious effects. However, it is believed that the provision of the boxes reduces the strain on the attachment of the shutter element to the support structure, and is conducive to greater shutter element life over a wide range of applied pneumatic pressures.

The shutter element 30" in FIG. 4B is better adapted for use as an "INSTANTANEOUS" or day shutter. A rectangular opening or aperture 41" is centered in the shutter element 30". Depending upon the exposure desired, the width of the aperture 41" can be easily determined. With the shutter element 30" of FIG. 4B, an exposure is made upon each application of air under pressure. If, initially, the air is applied to support element 32 of FIG. 3B, the shutter element 30" balloons to the left, and the aperture 41" traverses the film plane 42 for a complete exposure, obscuring the film at the completion of the traverse. By applying air to the opposite support structure 34, on the right side, a second exposure is made.

If the shutter element 30" is to be used in a high speed aerial camera with a preferred direction of focal plane shutter travel, a second or masking shutter may be provided, which, during the one-half of a cycle, prevents exposure of the film when the aperature "returns" to the initial position.

Turning next to FIG. 5, there is shown yet another embodiment, intended for use as an intralens shutter, to provide accurate exposure in a selected camera embodiment. The arrangement includes two shutter systems 51, 51', each of which includes an entire arrangement such as that illustrated in FIG. 3. These arrangements are adapted to operate to obtain extremely rapid exposures with extreme precision.

As seen in FIG. 5, there is included a first shutter assembly 51 including right and left support structures 52, 53, respectively, having ports 54, 55. A first shutter element 56 is fastened to the support structures 52, 53 at opposites edges.

Top and bottom plates 57, 58, 59, 60, are provided for the left and right support structures 52, 53 respectively. A second shutter assembly 51' is substantially identical to the first shutter assembly 51 and similar, primed reference characters have been applied to identify the various elements thereof.

FIG. 6 is illustrative of the various positions of a shutter element of the type shown in FIG. 4A, during the operation of the embodiment shown in FIG. 5. Assume that the initial position is that of FIG. 6A, in which the shutter element 56 has last been ballooned to the left, causing the shutter opening 62 thereof to move to the left of the optical axis 64, indicated by the dotted line. The second shutter element 56' has ballooned to the right, causing the opening thereof 62' to move to the right of the axis 64. In this configuration, each opening is completely masked by the opaque portions of the adjacent shutter element.

When air is applied through the port 54 of the structure 52, and to the port 55' of he structure 53', the first shutter element 56 moves to the right and shutter 56' proceeds to the left, venting air through the right hand port 54' while the element 56 proceeds to the right, venting air through the left hand port 55. The positions shown in FIG. 6B are reached by the shutter elements 56, 56' in the "open" position, during which the film is exposed.

To "close" the aperture and terminate the exposure of the photographic material, the air is switched to the opposite port of each structure causing the shutter elements 56, 56' to shift to the initial positions as shown in FIG. 6A.

It should be noted that the initial positions of the shutter elements 56 56', as shown in FIG. 6A, are such that they need only move half the distance that a normal, single shutter would be required to move to cause exposure. Thus, the exposure time may be decreased by one-half or the frame rate could be correspondingly increased.

It should also be noted from FIGS. 5 and 6 that, essentially, no moving parts other than the shutter elements 56, 56' are utilized in the shutter device. The advantages of this arrangement will be apparent to those skilled in the art.

An additional advantage of the arrangement shown in FIGS. 5 and 6 is the ease with which the shutter elements 56, 56' may be replaced should they become worn or tear after a period of time. Two simple fastenings along the edges 57, 58 are all that are required to maintain the shutter element 56 in position. Similarly, fastenings along edges 57′, 58′ are all that need be released in order to replace the shutter element 56′.

In FIG. 7 is shown yet another shutter embodiment utilizing a shutter element of the type shown in FIG. 4A. FIG. 7A shows an initial position of this shutter combination in which the apertures opening 71, 71′ are positioned to the left and right of the optical axis, respectively. It will be noted by comparison with FIG. 6 that the openings are displaced further from the optical axis than in the embodiment of FIG. 6. A central position of the elements during exposure of the photographic material is shown in FIG. 7B. The openings overlap so that the exposure is accomplished. As the shutter elements progress to the right and left, respectively, to the positions shown in FIG. 7C, the exposure is completed and the openings 71, 71′ are in the positions shown to the right and left, respectively, of the optical axis.

The embodiment of FIG. 7 is primarily suited for use as a "DAY" or "INSTANTANEOUS" shutter but can be easily converted to a "NIGHT" or "BULB" shutter by the addition of stop plates, at the points designated by the arrows N—N as seen in FIG. 7B.

As will be readily understood, a first operation then "opens" the shutter, while a switching of the input lines and a second activation "closes" the shutter.

The embodiment shown in FIG. 7 is useful in accomplishing extremely rapid exposures even though it requires a greater distance of travel for the two shutter elements. This is the case because there is no reversal of movement required for either of the shutter elements nor is any switching required of the air which provides the pressure to the two ends of the shutter elements.

However, each successive exposure will necessitate a switching of the air to the opposite structures so that the shutter elements can be driven in respectively opposite directions.

Other advantages, features, desirable alterations, and changes from the above disclosed arrangements will be quite obvious to those skilled in the art. However, the majority of such arrangements will be more obvious modifications which will be readily apparent to the skilled craftsman. For this reason, the invention should be considered limited only within the scope of the appended claims.

I claim:

1. In a camera having an optical axis, a pneumatically operated shutter mechanism adapted to be interposed orthogonal to the axis between the source of radiant energy and the image plane, comprising in combination:
    (a) an inelastic, flexible, fluid impermeable membrane having at least one edge;
    (b) a shutter member connected to said membrane and adapted to be moved orthogonally across the optical axis by membrane motion;
    (c) a chamber having first and second port means for separately communicating with sources of pneumatic fluid;
    (d) means for mounting said membrane to said chamber along said edge, intermediate said first and second port means, for separating said chamber into first and second portions, said membrane being movable in response to a pneumatic pressure differential, applied through said port means for volumetrically increasing and decreasing the portions to which relatively high and relatively low pressures are respectively applied;
    (e) a second inelastic, flexible, fluid impermeable membrane having at least one edge;
    (f) a second shutter member connected to said second membrane, and adapted to move in a path substantially in parallel with said shutter member orthogonal to the optical axis;
    (g) said shutter members overlapping at the optical axis, at one extreme of shutter motion, to block incident radiation from the image plane;
    (h) a second chamber having first and second port means for separately communicating with a source of pneumatic fluid;
    (i) means for mounting said second membrane to said second chamber along said edge intermediate said second chamber port means for separating said second chamber into first and second portions; and
    (j) means for selectively controlling the application of fluid under pressure to said port means for operating said shutter members, including means for applying fluid under relatively high pressure into corresponding ones of said chamber portions for moving said membranes and said shutter members away from said chambers orthogonal to the optical axis, to said one extreme of motion for blocking radiation and for applying fluid under relatively high pressure into corresponding others of said chamber portions for moving said shutter members toward said chambers to admit radiation along the optical axis.

2. The shutter mechanism of claim 1 wherein said second membrane has a second edge, said second shutter member being connected to said second membrane intermediate said edges; and
    further including means for mounting said second edge to said second chamber for maintaining the separation of said second chamber into said first and second portions, each including port means.

3. In a camera having an optical axis, a pneumatically operated shutter mechanism adapted to be interposed orthogonal to the axis between the source of radiant energy and the image plane, comprising in combination:
    (a) an inelastic flexible fluid impermeable membrane having a first and a second edge;
    (b) a shutter member connected to said membrane and adapted to be moved orthogonally across the optical axis by membrane motion, said shutter member comprising an apertured portion of said membrane intermediate said edges;
    (c) a chamber having first and second port means for separately communicating with sources of pneumatic fluid;
    (d) means for mounting said membrane to said chammember along said edge, intermediate said first and second port means, for separating said chamber into first and second portions, said membrane being movable in response to a pneumatic pressure differential, applied through said port means for volumetrically increasing and decreasing the portions to which relatively high and relatively low pressures are respectively applied;
    (e) a second chamber having first and second port means for separately communicating with a source of pneumatic fluid; and
    (f) means for mounting said membrane to said second chamber along said edge intermediate said first and second port means for separating said second chamber into first and second portions, said membrane being movable in response to a pneumatic pressure differential applied through said port means for volumetrically increasing and decreasing the portions to which relatively high and relatively low pressure are respectively applied.

4. The shutter mechanism of claim 3, above further including means connected to said port means for selectively applying a pneumatic pressure differential to said chamber portions in a predetermined sequence, for moving said shutter member aperture back and forth in a path orthogonal to the optical axis.

5. In a camera having an optical axis, a pneumatically operated shutter mechanism adapted to be interposed orthogonal to the axis between the source of radiant energy and the image plane, comprising in combination:
    (a) an inelastic, flexible, fluid impermeable membrane having a first and a second edge;

(b) a shutter member connected to said membrane and adapted to be moved orthogonally across the optical axis by membrane motion;
(c) a chamber having first and second port means for separately communicating with sources of pneumatic fluid;
(d) means for mounting said membrane to said chamber along one of said edges, intermediate said first and second port means, for separating said chamber into first and second portions, said membrane being movable in response to a pneumatic pressure differential, applied through said port means for volumetrically increasing and decreasing the portions to which relatively high and relatively low pressures are respectively applied;
(e) a second inelastic, flexible, fluid impermeable membrane having a first and second edge, said shutter member having an aperture therein and being connected to each of said membranes at said membrane second edges and operable in response to membrane motion for interposing said aperture in the path of applied radiant energy along the optical axis;
(f) a second chamber having first and second ports for separately communicating with a source of pneumatic fluid; and
(g) means for mounting said second membrane to said second chamber along said first edge, intermediate said second chamber first and second ports, for separating said second chamber into first and second portions, said second membrane being movable in response to a pneumatic pressure differential applied through said ports for volumetrically increasing and decreasing the portion to which relatively high and relatively low pressures are respectively applied.

6. The shutter mechanism of claim 5, above further including means connected to said port means for selectively applying a pneumatic pressure differential to said chamber portions in a predetermined sequence for moving said shutter member back and forth between said chambers, across the optical axis.

7. In a camera having an optical axis, a pneumatically operated shutter mechanism adapted to be interposed orthogonal to the axis between the source of radiant energy and the image plane, comprising in combination:
(a) first inelastic, flexible, fluid impermeable membrane having a first and second edge;
(b) an apertured shutter portion integral with said membrane intermediate said edges and adapted to move orthogonally across the optical axis with membrane motion;
(c) a first pair of chambers, respectively located on opposite sides of the optical axis, each of said chambers having an opening adapted to receive said first membrane;
(d) means for mounting said membrane through said openings to said first pair of chamber interiors along said edges said membrane separating each one of said first pair of chambers into first and second portions, said membrane being movable in response to a pneumatic pressure differential for volumetrically increasing and decreasing the portions to which relatively high and relatively low pressures are respectively applied;
(e) a first pair of ports respectively positioned in said first pair of chambers intermediate the chamber opening and said membrane edge, said ports being adapted to apply pneumatic fluid to said chamber interiors;
(f) a second inelastic, flexible, fluid impermeable membrane having a pair of edges;
(g) a second apertured portion element integrally connected to said membrane intermediate said edges and adapted to be moved orthogonally across the optical axis by membrane motion;
(h) a second pair of chambers respectively positioned on opposite sides of the optical axis, each of said chambers having an opening adapted to receive said second membrane;
(i) means for mounting said second membrane through said opening to said second pair of chamber interiors along said edges for separating each of said second pair of chambers into first and second portions, said second membrane being movable in response to a pneumatic pressure differential for volumetrically increasing and decreasing the portions to which relatively high and relatively low pressures are respectively applied;
(j) a second pair of ports respectively positioned in said second pair of chambers respectively connected to said chambers intermediate the chamber opening and said membrane edge, said ports being adapted to apply pneumatic fluid to said chamber interiors; and
(k) means adapted to be connected to a source of pneumatic fluid, and connected to said ports, for selectively applying pneumatic pressure differentials alternatively to one chamber of each pair for initiating membrane motion therein resulting in shutter motion orthogonal to the optical axis in respectively opposite directions.

8. A camera shutter mechanism of claim 7, above further including selectively actuable means attached to at least one of each said pairs of chambers for limiting membrane motion within such chamber, to alternatively provide DAY and NIGHT shutter action.

References Cited

UNITED STATES PATENTS

| | | | |
|---|---|---|---|
| 2,699,102 | 1/1955 | Doyle et al. | 95—54 |
| 3,100,997 | 8/1963 | Lorenz | 350—272 |

NORTON ANSHER, Primary Examiner

R. M. SHEER, Assistant Examiner

U.S. Cl. X.R.

350—269, 272